United States Patent [19]

Kieffer et al.

[11] Patent Number: 4,658,492

[45] Date of Patent: Apr. 21, 1987

[54] COIL ASSEMBLY MACHINE

[75] Inventors: Vernon E. Kieffer; Andrew J. Kliethermes, both of St. Louis County, Mo.

[73] Assignee: Emerson Electric Co., St. Louis, Mo.

[21] Appl. No.: 684,805

[22] Filed: Dec. 21, 1984

[51] Int. Cl.$^4$ .................... B23Q 41/02; H02K 15/00
[52] U.S. Cl. ................................. 29/564.6; 29/596; 29/734
[58] Field of Search .............. 29/564.6, 564.5, 596, 29/564.8, 606, 564.1, 564.2, 734, 564.7, 736

[56] References Cited

U.S. PATENT DOCUMENTS

| | | | |
|---|---|---|---|
| 3,324,536 | 6/1967 | Hill | 29/606 X |
| 3,616,512 | 11/1971 | Appenzeller et al. | 29/564.6 |
| 3,634,932 | 1/1972 | Mason | 29/564.6 |
| 3,643,317 | 2/1972 | Arnold et al. | 29/564.6 |
| 3,714,973 | 2/1973 | Kieffer et al. | 29/596 X |
| 3,742,596 | 7/1973 | Smith et al. | 29/596 |
| 4,151,636 | 5/1979 | Lauer et al. | 29/734 X |
| 4,186,478 | 2/1980 | Hamane et al. | 29/734 X |
| 4,416,058 | 11/1983 | Henry et al. | 29/734 |
| 4,433,466 | 2/1984 | Koening | 29/564.6 |

FOREIGN PATENT DOCUMENTS 2103520 2/1983 United Kingdom .................. 29/734

Primary Examiner—William R. Briggs
Attorney, Agent, or Firm—Polster, Polster and Lucchesi

[57] ABSTRACT

A coil assembly machine for automatic loading of stator cores for dynamoelectric machines, automatic winding insertion, high speed wedge manufacture, automatic wedge insertion, and automatic core removal from the machine is provided in a construction of relatively low cost and high productivity. The machine is designed to operate in conjunction with conventional coil winding devices and improves manufacturing efficiency at relatively low cost. In the preferred embodiment, a four position arrangement is employed. Each position includes an upper tooling assembly of an axial insertion machine. An operator places wound coils on the upper axial insertion tooling. The upper insertion tooling then rotates to a stator core placement position, where the core is placed on the tooling and wedges are positioned for placement in the core. Thereafter, the core and winding move to an insertion position where the coils are inserted axially and wedges are placed in slots of the stator core. The now winding loaded core rotates to a removal position, where the winding/core combination is removed from the machine. Operations are controlled so the various processes occur in a predetermined timed relationship.

11 Claims, 23 Drawing Figures

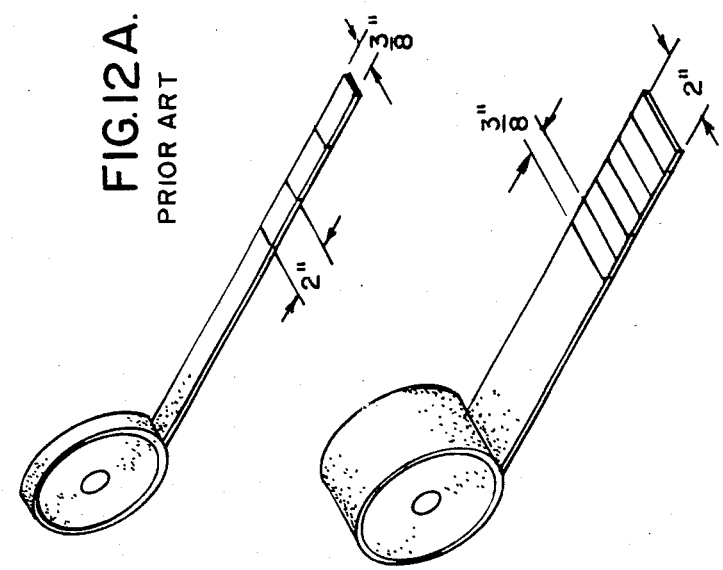
FIG.12A. PRIOR ART
FIG.12B.
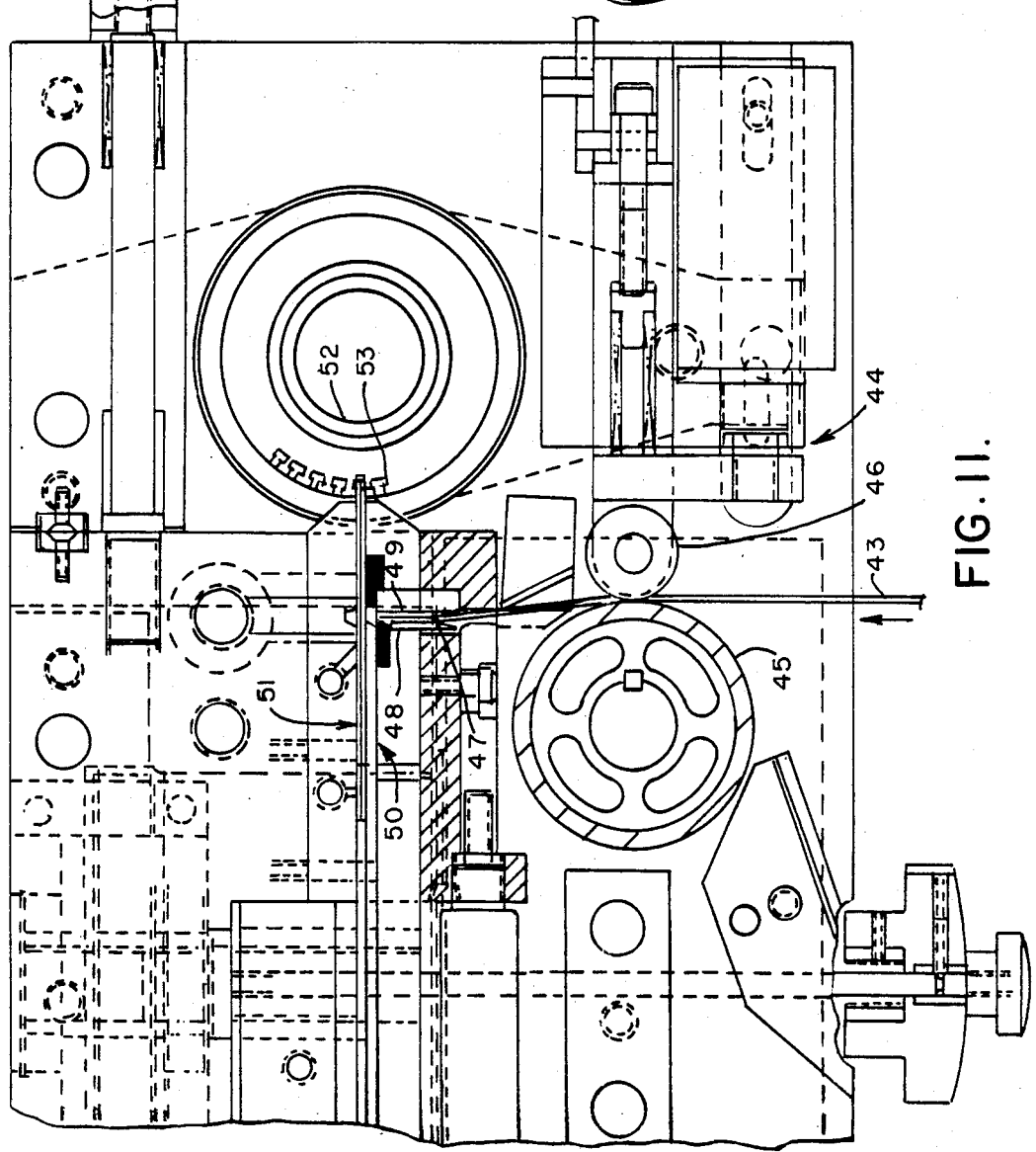
FIG.11.

COIL ASSEMBLY MACHINE

BACKGROUND OF THE INVENTION

This invention relates to the manufacture of stator assemblies for dynamoelectric machines, and in particular to a machine for automating certain portions of the winding and wedge insertion process in the manufacture of stator assemblies for such dynamoelectric machines. While the invention is described with particular emphasis on its use in conjunction with AC induction motors, those skilled in the art will recognize the wider applicabilities of the inventive principles disclosed hereinafter.

The U.S. Pat. No. 3,714,973 to Kieffer, ('973) discloses a relatively high speed winding machine which can be used to form windings for a dynamoelectric machine. The windings, after formation, are stored on low cost transfer tools which were transported to an axial insertion machine of the type disclosed in the U.S. Pat. No. 3,324,536 to Hill, ('536). The winding machine disclosed in the Kieffer patent provided for improved motor production rates which were obtained relatively simply and inexpensively. The disclosures of the above-noted Hill and Kieffer patents are incorporated herein by reference. The apparatus and method disclosed hereinafter enables a motor manufacturer to again substantially increase motor production rates at relatively low cost by employing the device of this invention in connection with such winding machines similar to those desired in Kieffer '973. That employment enables a motor manufacturer to substantially increase production rates, reduce personnel requirements and reduce costs.

The coil assembly machine of this invention is a four station device which utilizes an operator to place pre-wound stator coils on the upper tooling of an axial insertion device. The tooling then rotates to a core placement position, then to a winding and wedge insertion position; then to a wound core removal position; returning thereafter to the operator coil placement position. The upper tooling assemblies are carried by a rotatable table which rotates the respective upper tooling assemblies in 90 degree increments so that winding coils are loaded by the operator after each increment. The machine automatically and continuously forms wedges for use at the winding insertion position of the device and loads them into a magazine for storage. The wedges then are are carried by the tooling of the axial insertion process to the winding insertion position for placement in the stator core, after winding insertion is completed. A particularly novel and high speed method of forming such wedges is disclosed. The device of this invention uses material for forming wedges which has a width dimension corresponding generally to the height dimension of the stator core. This relatively wide material can be advanced a short distance to form a wedge, with the result that wedge productivity can be increased dramatically. Prior art wedge machines used narrow material and the material is advanced and cut at the length of the stack height. The apparatus of our invention also utilizes the core pick-up and placement device which properly orients cores in conjunction with the windings for axial insertion.

One of the objects of this invention is to provide a low cost coil assembly machine.

Another object of this invention is to provide a coil assembly machine which has relatively high production rates and relatively low initial cost.

Another object of this invention is to provide a coil assembly machine which automatically places cores on axial insertion tooling and automatically removes cores from such machine.

Another object of this invention is to provide a coil assembly device which automatically forms wedges for isertion in the core of a dynamoelectric machine.

Still another object of this invention is to provide a method and device for manufacturing wedges at high speed.

Another object of this invention is to provide a wedge making device in which the width of the wedge material corresponds to the stack height of the core assembly so that the material need be advanced only a fraction of the stack height in order to permit the cutting and forming of an insulation wedge.

Other objects of this invention will be apparent to those skilled in the art in light of the following description and accompanying drawings.

SUMMARY OF THE INVENTION

In accordance with this invention, generally stated, a coil assembly machine is provided which includes a multiple position movable upper tooling assembly. The upper tooling assembly corresponds to the tooling of a conventional axial insertion machine. Cores for dynamoelectric machines are fed to a pick-up location. Adjustable and controllable arm assemblies pick up the cores and place them individually on the tools at a first station, and remove them at another station. Intermediate the loading and unloading stations are a coil transfer station and a coil insertion position. The upper tooling assembly is aligned with lower tooling at the coil insertion position. An automatic high speed wedge making device loads a magazine with wedges, which are transferred to the movable upper tooling so that wedges are available for insertion simultaneously with the winding axial insertion process.

BRIEF DESCRIPTION OF THE DRAWINGS

In the drawings,

FIG. 11 is a sectional view taken along the line 11—11 of FIG. 4 showing a wedge machine used in conjunction with the coil assembly device of this invention;

FIG. 12A is a view in perspective illustrating the advancement of wedge material prior to my invention; and FIG. 12B is a view in perspective illustrating the advancement of wedge material in connection with the wedge maker of FIG. 12.

DESCRIPTION OF THE PREFERRED EMBODIMENT

Figure 1:
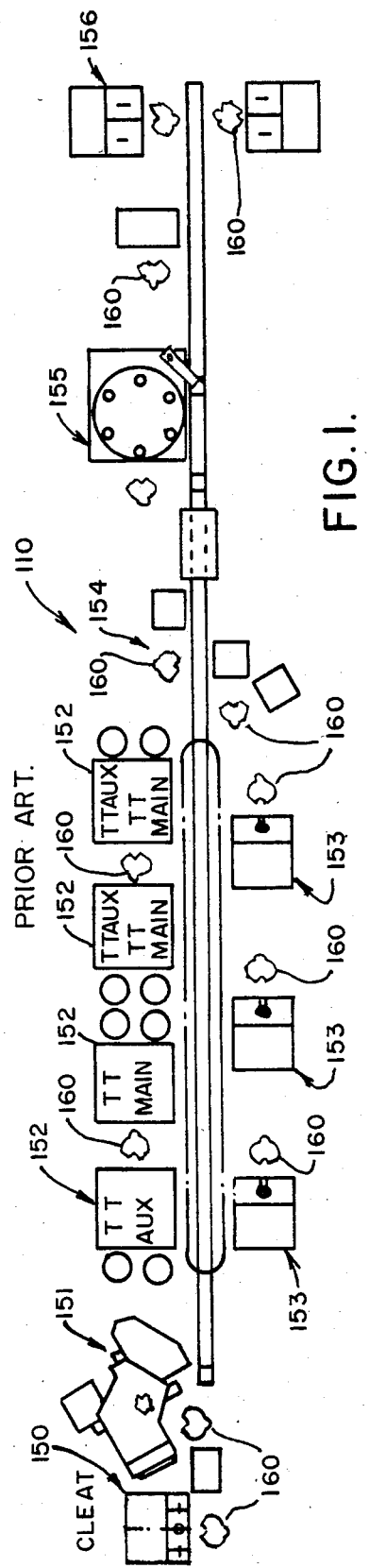
FIG. 1 is a diagrammatic view illustrating a prior art motor manufacturing line.

Referring now to the FIG. 1, reference numeral 110 indicates one illustrative embodiment of a motor production line known in the prior art. In the construction sequence used in conjunction with the production line 110, cores, indicated generally in the various views by the reference numeral 21, are formed at a station 150. Core manufacture conventionally is accomplished in a variety of known ways. For example, cleating, welding and epxoy bonding of cores are common techniques used to attach individual laminations of the cores to form integral units. As will be appreciated by those skilled in the art, the core of a dynamoelectric machine is constructed from a plurality of individual laminations. Each of the laminations have a central opening in them. A plurality of closed bottom receptacles extend radially outwardly from the central opening. When joined to one another to form a core, the central opening delimits a rotor receiving bore opening 140 and the close bottom receptacle winding receiving slots. The slots are separated by lamination teeth, the free tips of which delimit the bore opening. Any of the known lamination attachment methods are compatible with our invention.

After assembly, the cores have slot insulation inserted in them at a station 151. As will be appreciated, the slot insulation is available in a variety of forms. All forms, however, are intended to protect and insulate the electromagnetic material of the laminations forming the core from the windings. Conventionally, a plurality of winding machines 152, similar to those described in the U.S. Pat. No. 3,714,973, to Kieffer, the disclosure of which is incorporated herein by reference, were utilized to backlog a plurality of coils on low cost transfer tools. Motor windings generally include a main winding and an auxiliary winding. The windings in turn are formed from coils of wire, individual turns of which are adapted to span predetermined number of teeth in the inserted position of the turns. In the particular motor line shown in FIG. 1, four of the winders 152 were employed to feed three axial insertion machines 153. The axial insertion machines are similar to those described in the U.S. Pat. No. 3,324,536 to Hill, the disclosure of which is incorporated herein by reference. After coil winding and insertion, the cores are carried to a electrical connection station indicated generally by the reference numeral 154 where lead wires are attached to the windings. After connection, the windings of the stator assembly were blocked at a station 155. Thereafter, the now completed stator assembly is inspected for defects at an area generally indicated by the numeral 156.

The conventional manufacturing process just described required thirteen personnel to operate the motor line effectively. While the motor manufacturing technique described above worked well for its intended purposes, it is relatively labor intensive.

Figure 2:
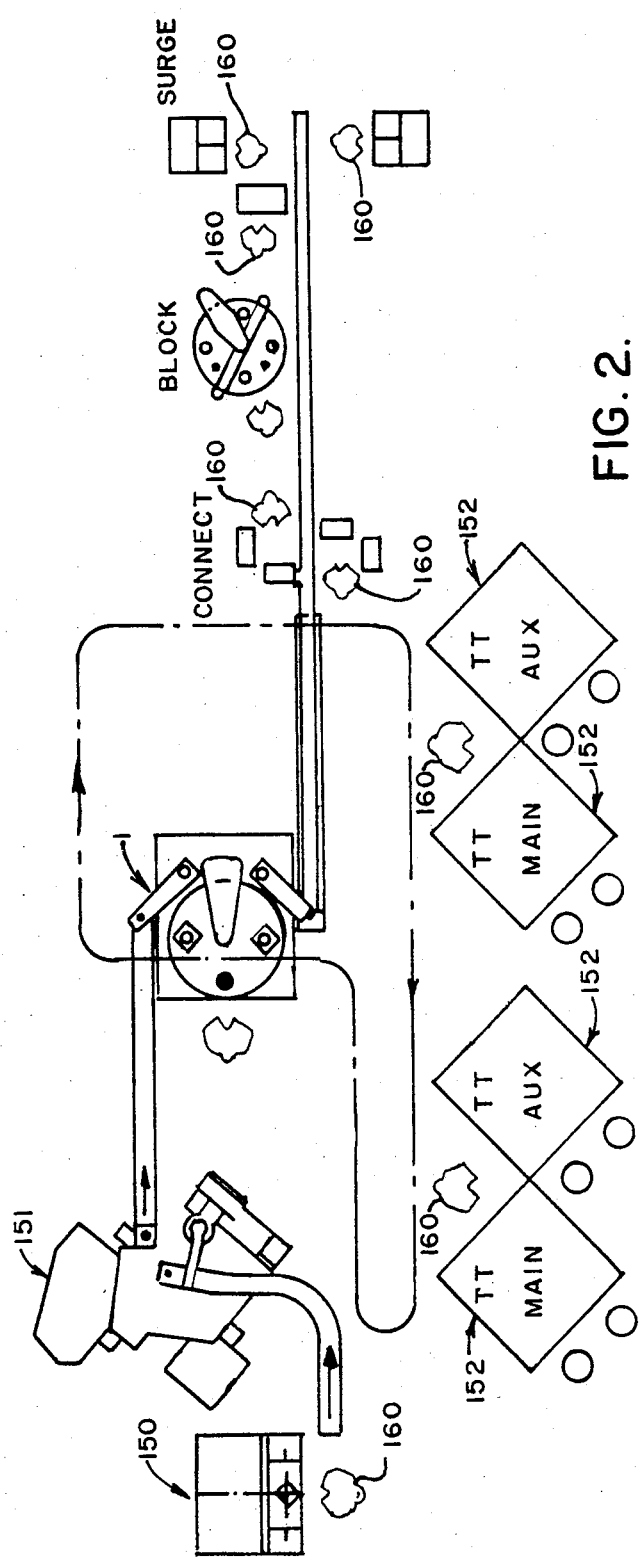
FIG. 2 is a diagrammatic illustration showing an improved motor manufacturing line utilizing a coil assembly machine of this invention.

Referring now to FIG. 2, a more automated system employing the core assembly device 1 of this invention is integrated into an improved motor production line. Common reference numerals are used throughout the various views, where appropriate. Again, the individual stator laminations are constructed to a predetermined stack height for the cores 21 at a station 150. The cores then pass to the slot insulation station 151, which also may be automated, if desired. From the slot insulation station, the cores pass to a station employing a coil assembly device 1 of this invention.

The coil assembly device 1 is fed from a plurality of the winding machines 152. Coils for the motor windings are prewound and stored on low cost transfer tools for use with the coil assembly device 1. The remaining motor manufacturing line positions are the same as those described in conjunction with FIG. 1, and consequently are not described in detail.

In each of the FIGS. 1 and 2, a plurality of line personnel 160 are shown operating the various devices employed in connection with the motor line. As will be appreciated by those skilled in the art, the manufacturing system or motor line shown in FIG. 1 employs thirteen workers in order to obtain its production rate. The motor manufacturing method of FIG. 2 employs ten line personnel and attains a substantially higher rate of production than that shown in FIG. 1. This higher rate of production obtained with the production line of FIG. 2 is attained because of the use of the core assembly device 1 of this invention.

Figure 3:
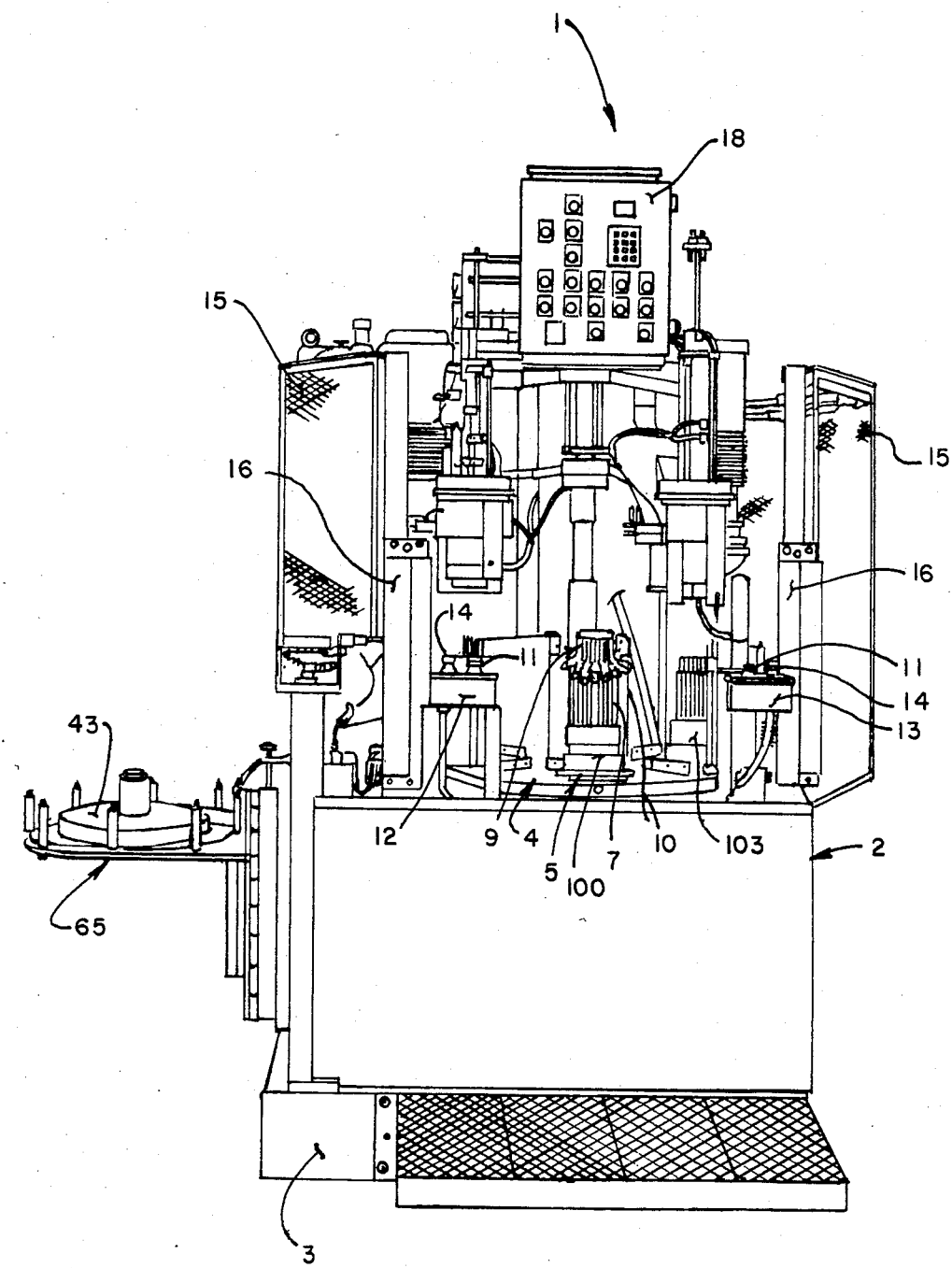
FIG. 3 is a front view of one illustrative embodiment of coil assembly machine of this invention, in its production form.

Referring now to FIG. 3, it may be observed that the coil assembly device 1 includes an enclosure 2 supported on a base structure 3. The enclosure 2 houses certain devices described in greater detail hereinafter. For present purposes, it is important to note that the device 1 includes a rotary index table 4 having a plurality of operating positions associated with it. In the embodiment shown in FIG. 3, the rotary table 4 includes four such positions, each of which is indicated generally by the reference numeral 5.

Figure 10:
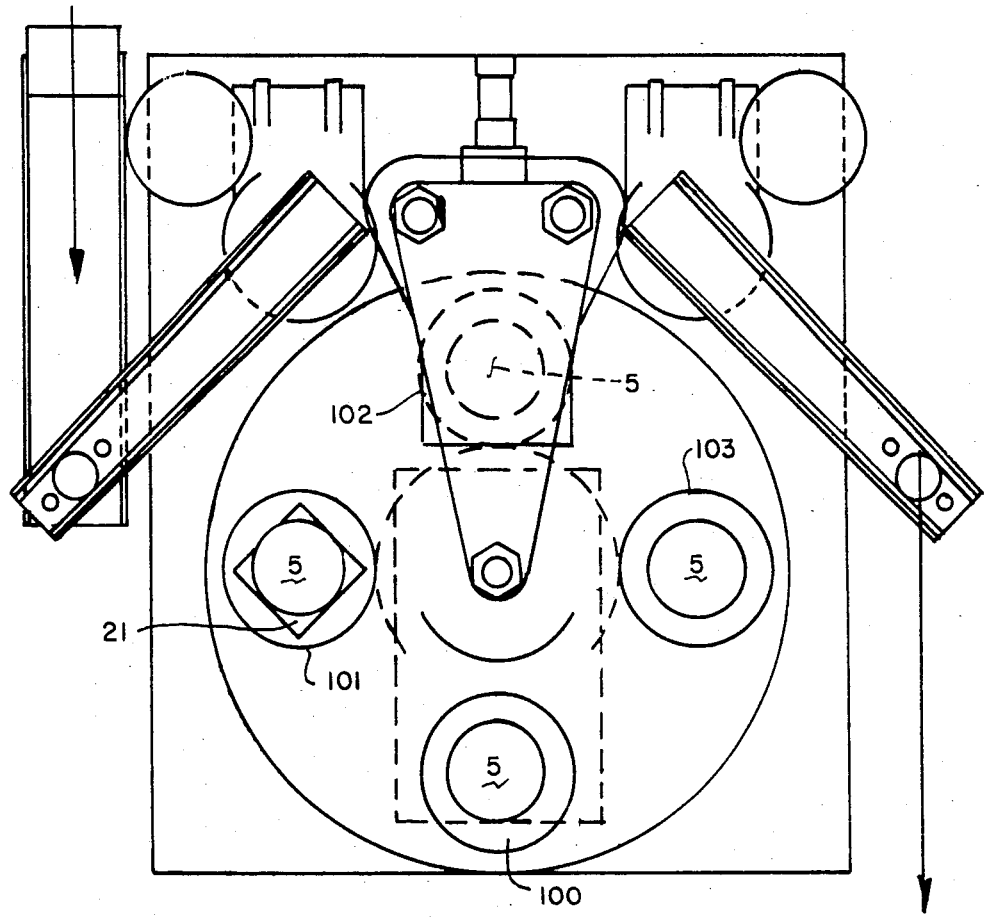
FIG. 10 is a top plan diagrammatic view useful in describing the operation of the device shown in FIG. 8.

Referring to FIG. 10, the operating positions 5 on table 4 generally include an operator position or station 100, a core loading position or station 101, a coil inerting position or station 102 and a core removal position or station 103.

Each of the positions 5 is identical, and a single position 5 is described in detail for brevity. Specifically, a position 5 comprises an upper tooling assembly of an axial insertion machine. An individual axial insertion machine may be similar to that described in Hill, U.S. Pat. No. 3,324,536, for example. Such assemblies include a plurality of wedge guides 6 and blades 7, best observed in FIGS. 7A, 7C or 7E. Conventionally, the wedge guides 6 are stationary, while the blades 7 are movable during the winding coil insertion process. As shown in FIG. 7A, an axially moving device 8, commonly known as a stripper, is movable axially between a first position, near the lower end of the wedge guides 6, and an upper or second position, not shown, above the free end of the wedge guides. As the stripper 8 moves between first and second positions, it carries at least some of the plurality of blades 7 axially upwardly with it, and drives the individual turns forming the coils of the motor windings into the slots of a corresponding stator core assembly, the latter not being shown in FIG. 7A. The axial insertion process and the particular embodiment for accomplishing coil insertion, per se, are exemplary of a variety of such processes and methods which, within the broader aspects of this invention, may be used in conjunction with the core assembly device 1. It is important here to note, however, that the upper tooling is utilized for the position 5 plurality.

Referring now to FIG. 3, a transfer tool 9 is shown in its inverted or unloading position on the blades 7. That is to say, the transfer tools described in the above-referenced Kieffer U.S. Pat. No. 3,714,973, are loaded at one of the winding machine stations 152, as shown in FIG. 2. The transfer tools are then carried to the device 1 by any convenient method. A suitable conveyor works well, for example.

At the device 1, the coil laden transfer tools 9 are inverted and placed on the blades 7 in a predetermined relationship. A plurality of coils of wire indicated generally by the numeral 10, which will become the motor winding, is thus transferred to the blades 7 of the upper tooling assembly for the axial inserter apparatus employed with the device 1.

After placement of the coils 10, the transfer tool 9 is removed. Device 1 operation is initiated by an operator, not shown, who manually engages both of a pair of start buttons 11 located on a pair of control boxes 12 and 13, respectively. The control boxes 12 and 13 also include emergency stop buttons 14 which may be employed by the operator to cease operation of the device 1. It is important to note that there are two of the start buttons. This means that an operator must utilize both hands prior to initiation of the operation of the device 1. After initiation, operation of the device 1 is automatic. That is to say, initiation of the start buttons causes the rotary table 4 to index 90 degrees to the position 101 shown in FIG. 10.

An optical safety device 16 in the embodiment illustrated, is a series of infrared transmitters and receivers which guard the operator position during indexing of the rotary table 4 so that breaking of the infrared circuit between sensor and transmitter portions of the optical sensor 16 causes the rotary table to cease indexing, should it be in a movement mode. Once the rotary table 4 reaches a position 90 degrees from its starting point, succeeding operation of the device 1 take place. Each 90 degree rotation of the table 4, however, is initiated by the operator, after placing the coils 10 on the blades 7, by engaging the start buttons 11. These operations are described in greater detail hereinafter.

As a further safety measure, a plurality of screens 15 are disposed about the device 1. The particular design and placement of the screens 15 are a matter of design choice, and may vary in other embodiments of the invention. A control panel 18 is provided along an upper end of the enclosure 2. The control panel 18 is used when various operations of the device 1 need to be accomplished individually, as for example, in a manual mode for set-up or for maintenance of the device 1.

Figure 5:
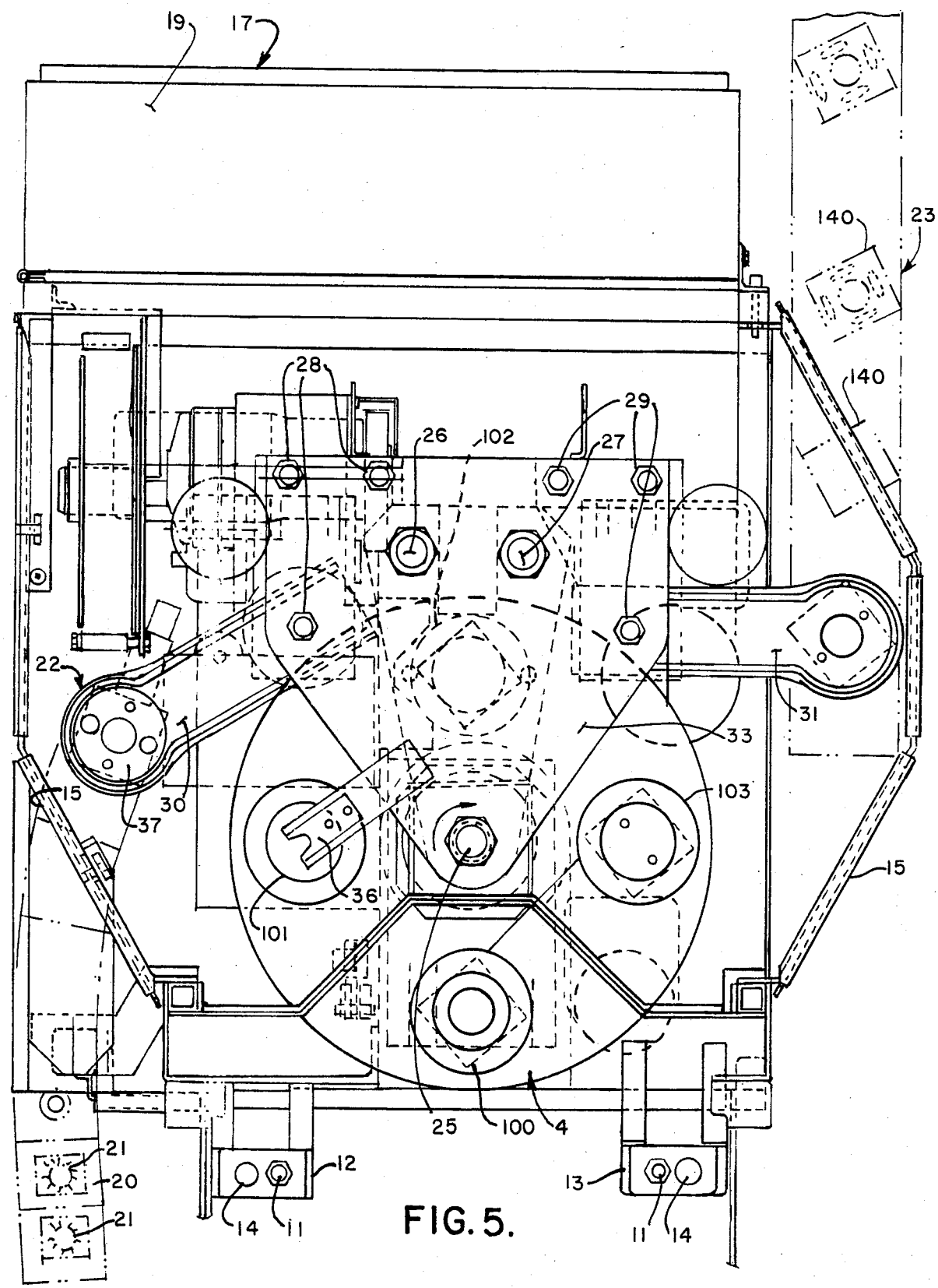
FIG. 5 is a top plan view of the coil assembly machine shown in FIG. 3.

Also mounted near the upper portion of the enclosure are a pair of robot arms 30 and 31, respectively (see FIG. 5). The arm 30 functions to load cores 21 onto the index table 4 while the arm 31 is intended to unload completed, wound cores 21 from the device 1.

An ingress conveyor 20 is operatively connected to the device 1 at a location enabling the robot arm 30 to pick one of a plurality of the stator cores 21 from the conveyor 20. The attitude of the conveyor 20 with respect to the device 1 is a matter of design choice. In FIG. 5, the conveyor 20 is shown feeding from a forward direction. Those skilled in the art will recognize that the direction of feed can be altered in other embodiments. In any event, the cores 21 reach a core pick up position indicated generally by the reference numeral 22. At the pick up position 22, the arm 30 engages the core, and rotates counterclockwise, as viewed in FIG. 5, to position the core on the table 4 at the station 101. Simultaneously with robot arm 30 operation, arm 31 functions to remove a corresponding completed stator assembly 140 (i.e., a core 21 with its winding inserted therein) from the station 103, the arm 31 thereafter depositing the completed stator assembly on an outfeed conveyor 23 for transporting completed stator assemblies for further processing as described above. The cores have the coils or windings 10 inserted into them at the station 102, that station being shown in dashed lines in FIGS. 5 and 10.

In general, the device 1 operates at high speed to form a plurality of wedges. The wedges are loaded into a suitable magazine or storage container. After all wedges are manufactured, the wedges are transferred to a pre-insertion position in the upper tooling 5 at the station 101. Upon rotation, the upper tooling and wedges are rotated to the position 102, and the winding and wedges are inserted into the core 21. The partially completed stator assemblies are removed from the device 1 at the station 103.

A rear portion 19 of the enclosure 2, best seen in FIG. 5, provides an enclosure for a programmable, electrical controller and servo drive system indicated generally by the reference numeral 17. The system 17 controls the various functions of the device 1 described herein. The drive system is conventional, and is not described in detail. The remaining Figures show various component parts of the device 1 for accomplishing the purposes described.

In the embodiment of our invention shown in FIG. 5, three rods 25, 26 and 27, respectively, extend vertically downwardly to a suitable support in the enclosure 2, not shown. The support rods 25, 26, and 27 function to support the robot arms 30 and 31, and other upper tooling structure associated with the device 1. Referring now to FIG. 6A, a support plate 33 is mounted on the respective support rods 25, 26 and 27. The plate 33 provides a support structure for rotatably supporting the arms 30 and 31 along a respective three point connection indicated generally by the reference numerals 34 and 35.

Figure 8A:
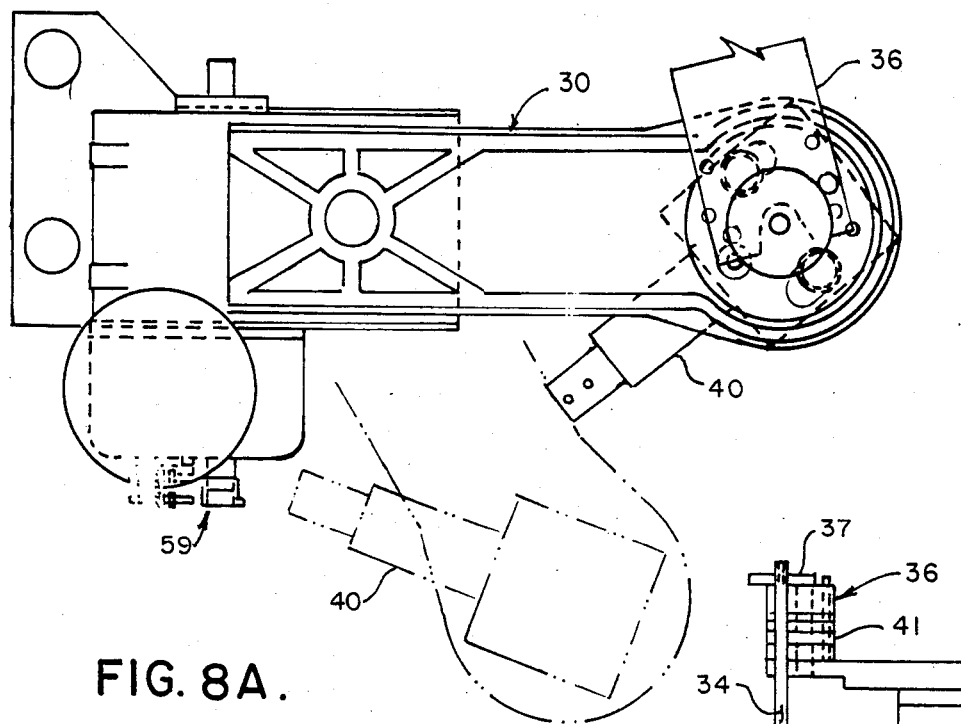
FIG. 8A is a top plan view of the arm shown in FIG. 8.
Figure 8:
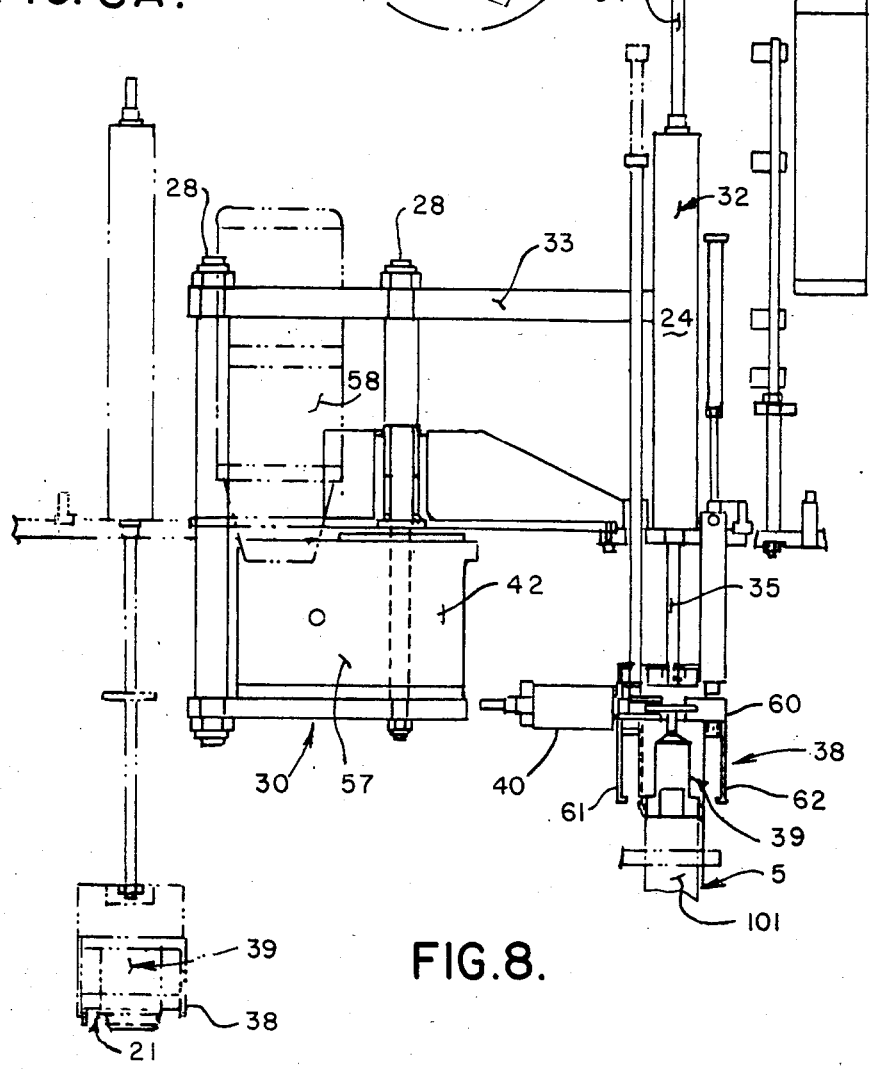
FIG. 8 is one illustrative embodiment of a robot arm used in conjunction with the device of FIG. 3, illustratively shown for the loading station of the device shown in FIG. 3.

The arm 30 assembly is shown in greater detail in FIG. 8. As thereshown, the arm 30 assembly includes a piston and cylinder unit 32. The cylinder unit 32 is a double ended cylinder, having a first rod 34 and a second rod 35 extending axially outwardly from a body 24. The rod 34 has a stop 37 associated with it. The cylinder 32 and arm 30 rotate between the solid line position shown in FIG. 8, and the dashed line position (also shown in FIG. 8). In the solid line position, the cylinder 32 is axially aligned with the upper tooling assembly 5 in the position 101 of the index table 4. Also mounted to the cylinder 32 are a gripper means 38 and an alignment spider 39. A cylinder 40 is operatively attached to a hand assembly 60 of the arm 30. The gripper means 38 is activated by means of cylinder 40. The cylinder 40 operates to move at least two fingers 61 and 62 of hand assembly 60 reciprocally with respect to one another to engage and disengage the core 21 at the core pick up position 22. After pick up, the core 21 is deposited at the station 101 in the device 1.

The alignment means 39 checks both the alignment of the cores 21 prior to their engagement by the gripper means 38, and the alignment of the blades 7 of the upper tooling, prior to depositing the core thereon during the operation of this device. That is to say, the alignment means 39 is actuated by the cylinder 32 prior to closure of the fingers 61 and 62 to ensure proper alignment of the core 21. Limit or pressure switches (not shown) may be employed to sense mis-alignment. The position of the upper tool also is checked in a similar way prior to release of the core after it is positioned over the upper tooling.

Figure 9:
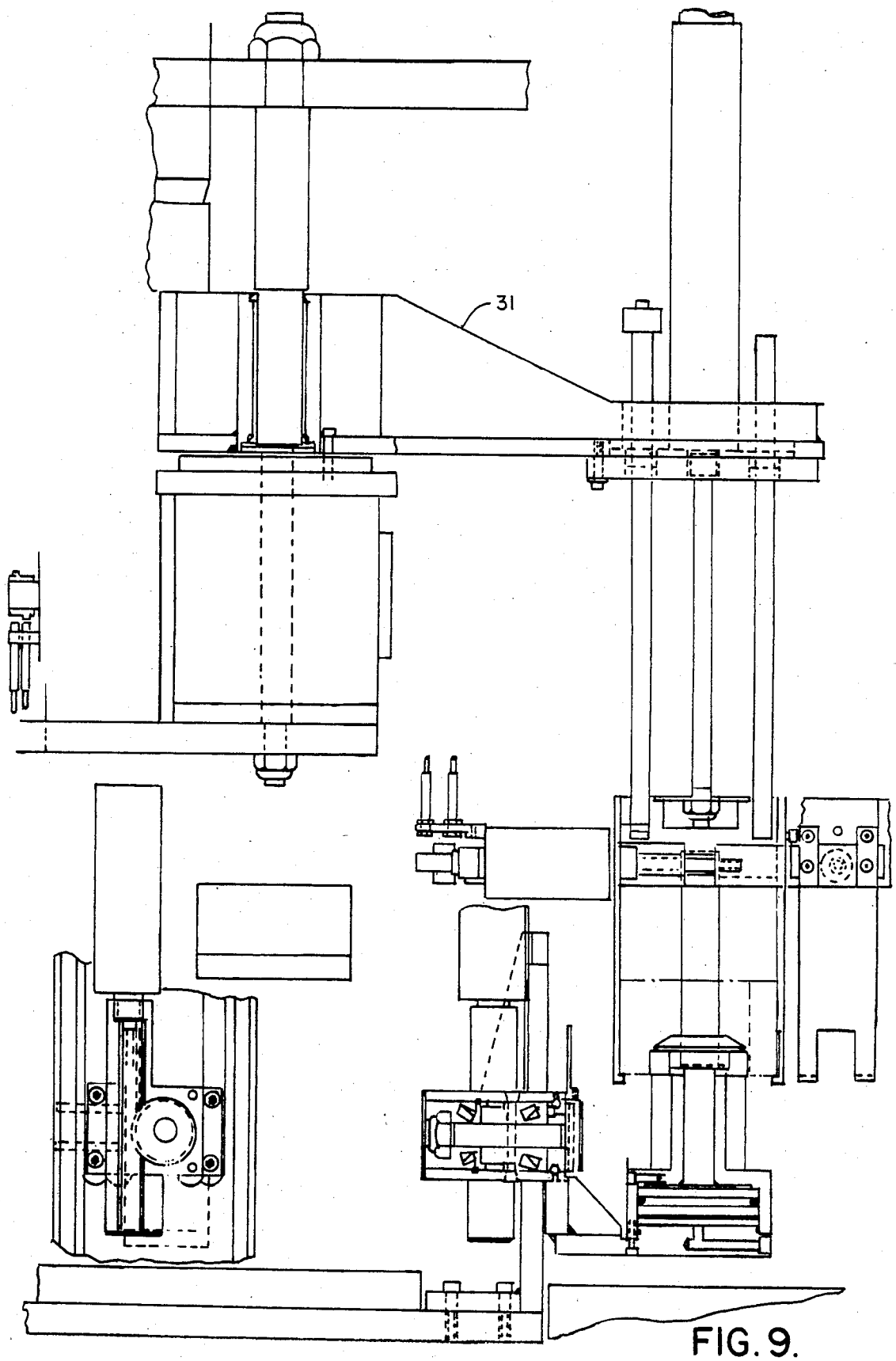
FIG. 9 is one illustrative embodiment of a robot arm employed in conjunction with the device of FIG. 3 for unloading stator cores from the device shown in FIG. 3.

A stop assembly 36 includes a plurality of removable adjustment stops 41. The adjustment stops 41 function to vary the depth of the stroke of the cylinder 32, or more precisely, of the rod 34. Alteration of stroke depth or length is accomplished by the insertion or removal of stops 41 in the adjustment means 36. Because of such adjustment, the arm 30 is permitted to have different pick up and deposit vertical heights, vertically being referenced to FIG. 8. In the dash line position of the arm 30 (as shown in FIG. 8), the stop 37 is clear of any of the adjustment stops 41, and cylinder 32 stroke operation can be controlled in a normal way. In the solid line position, however, the stop 37 meets the stops 41 to provide a position and adjustable stop position. FIG. 9 is a top plan view of the arm 30. It shows, as do FIGS. 5 and 10, movement positions for the arm 30.

The arm 30 is operated by an oscillator means 42. Oscillator 42 includes a drive 57 and power source 58, which control movement of the arm 30 between the first and second positions shown in FIG. 8. A suitable proximity switch, indicated generally by the reference numeral 59 (FIG. 8A), is used to signal end of arm 30 movement.

FIG. 3 illustrates a supply area support 65 from which wedge material 43 is drawn so that it may be fed to the wedge manufacturing facility of the device 1. Wedge material commonly is constructed from electrically insulative material. Material sold under the trademark "Mylar", available from the E. I. Du Pont de Nemours Company, works well. Referring now to FIG. 11, the material 43 is fed into a high speed wedge maker, as generally indicated at 44. The wedge maker 44 uses a feed roller 45 and a pressure roller 46 to advance the wedge material 43 to a cut off and form track 47. The track 47 includes a pair of guides 48 and 49, respectively. For example, a cut off punch 50 is operated by any convenient means. A conventional power driven eccentric may be used to advance and retract the punch 50 in accordance with known principles. The feed roller 45 is timed with the device driving the punch 50 so that a predetermined amount of the wedge material 43 is simultaneously advanced for cutting with operation of the punch 50.

A wedge form punch 51 is reciprocally operated by a second eccentric (not shown) driven by a suitable drive source. The form punch 51, the cutoff blade 50 and the feed roller 45 all are operated in synchronization with one another so that advancement of the wedge material 43, cutting of the wedge material by the blade 50, and forming of the wedge material by the punch 51 all are operated in synchronization with one another. Also operated in synchronization with the above referenced device is a wedge magazine 52. The wedge magazine 52 is a cylindrical magazine having a plurality of slots 53 formed in it. The slots 53 are sized to receive the formed wedge material (not shown) which is inserted in the magazine 52 by the punch 51.

Figure 4:
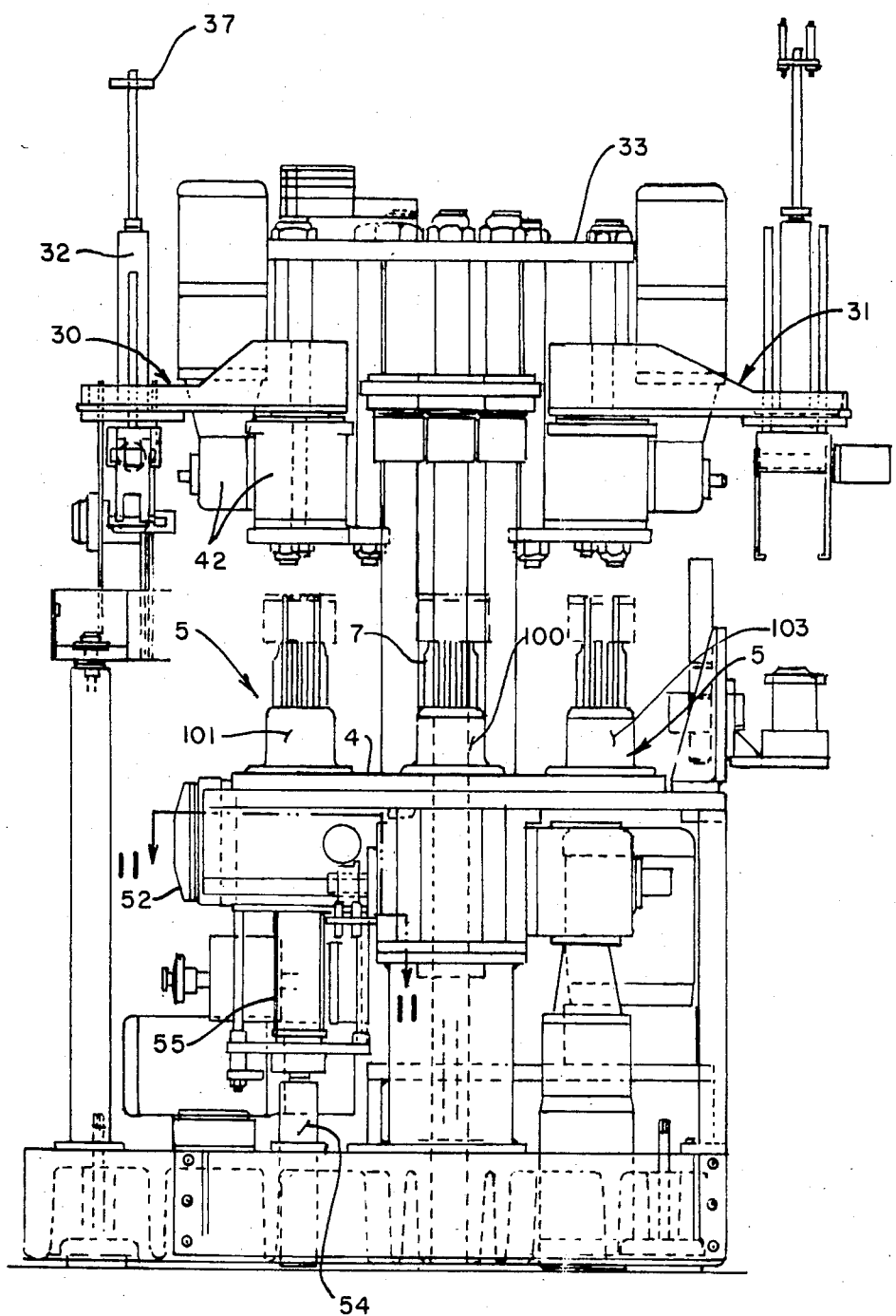
FIG. 4 is a front elevational view corresponding to the view of FIG. 3, showing a coil assembly machine of this invention without an enclosure.

As shown in FIG. 4, the magazine is positioned below the station 101 of the upper tooling 5. As there shown, a piston and cylinder unit 54 is mounted below the magazine 52. The cylinder 57 operates a plurality of pusher blades 55 which advance the wedges in the magazine 52 to the upper tooling 5 after loading of the magazine 52 is completed. Loading of the wedges at the station 101 means that little force is required to position the wedges for insertion at the station 102.

Figure 12:
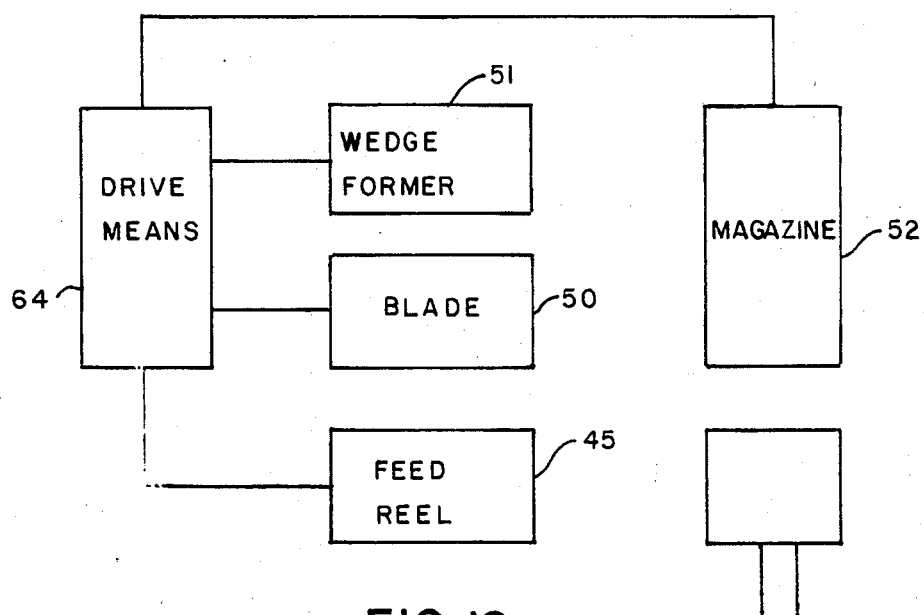
FIG. 12 is a block diagrammatic view of this invention illustrating the operation of the wedge machine shown in FIG. 12.

As indicated above, the magazine 52 and the associated equipment for forming and storing the wedges in the magazine all operate in synchronization with one another. This is diagrammatically illustrated in FIG. 12, where a drive means 64 is shown operatively connected to the magazine 52, the wedge former 51, the blade 50 and the feed reel 45. Another important feature of the wedge forming mechanism of this invention is that the wedge material need only be fed a short distance in order to form wedges. In the prior art, conventionally relatively narrow material was advanced a distance corresponding to the core stack height of the stator core for which laminations were being manufactured. This is illustratively shown in FIG. 12A. With the wedge forming method of the device 1, the wedge height is chosen to be the width of the material, illustratively shown as 2 inches in FIG. 12B. Consequently, the feed roller need only advance the material approximately ⅜ of an inch, in the embodiment illustrated, in order to have sufficient material to form a wedge. This has two important effects. The forming of the wedges is accomplished substantially more quickly than can be accomplished with prior art wedge formers, since only ⅜ of an inch of material need be advanced to form a wedge, as opposed to two inches in the similar prior art methods. In addition, a given diameter roll 43 of wedge material will produce substantially more wedges. This means that the device 1 can operate for a substantially longer periods without the need for "down time" while wedge material is reloaded. The use of wide materials, of course, means that material widths corresponding to each core stack height for which wedges are being formed must be available. This is not a detriment for most manufacturers because the materials for wedges is purchased in wide width rolls. The material thereafter is cut to desired dimensions.

Another beneficial aspect of the wedge forming system of this invention is that it often is desirable to include a chamfer on at least one end of the wedges. When wedges are formed from material lengths, the chamfer necessarily is provided on both ends of a preselected wedge length. Since the wedges must undergo subsequent operations, including insertion in the core, two ended chamfered edge wedges can cause operational difficulties in the wedge repair process. With the method of this invention, the chamfer can be formed only on the insertion end, and that end is not subject to further operations after its placement in the magazine, other than insertion in the stator core, for which the chamfer was designed.

Figure 6:
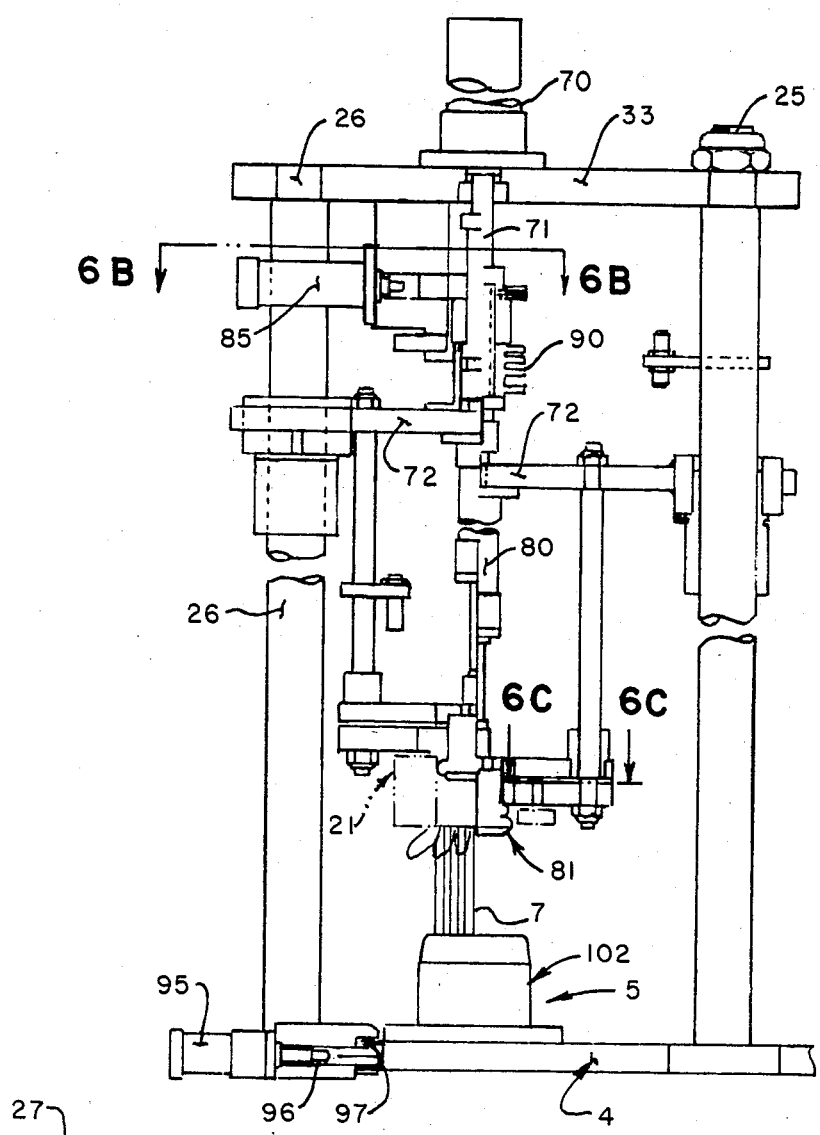
FIG. 6 is a detailed view showing one illustrative embodiment of clamp assembly utilized in conjunction with the core assembly machine of FIG. 3.
Figure 6A:
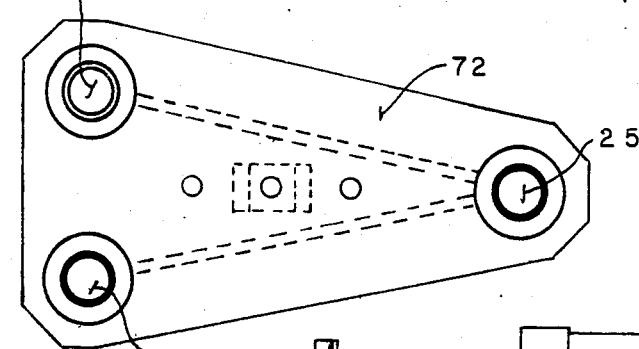
FIG. 6A is a top plan view of a movable platen used in conjunction with the clamp assembly shown in FIG. 6.
Figure 6C:
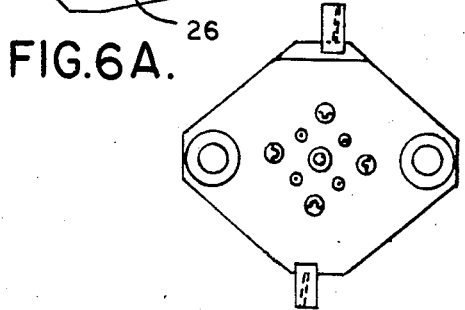
FIG. 6C is a sectional view taken along the line 6C—6C of FIG. 6.

Referring now to FIG. 6, the position 102 for the upper tooling 5 is illustrated. As thereshown, the support plate 33 has a cylinder 70 mounted to it. The cylinder 70 has a drive rod 71 operatively mounted to it for reciprocal movement between at least a first position and a second position. Mounted below the support plate 33 is a movable clamp platen 72. The platen 72 is shown in a first position on the left hand side of FIG. 6, and a second position on the right hand side of FIG. 6, to illustrate the first and second positions of the clamping mechanism used in association with the position 102. In the position of the platen shown on the left hand side of that Figure, the cylinder 70 and in the particular the rod 71 is at upward or retracted position.

The platen 72 also has a second cylinder 80 mounted to it. The cylinder 80 has an alignment means 81 operatively associated with it. The alignment means 81 is operated by the cylinder 80 to ensure that the blades 7 of the upper tooling 5 are in proper position for insertion of the winding.

Figure 6B:
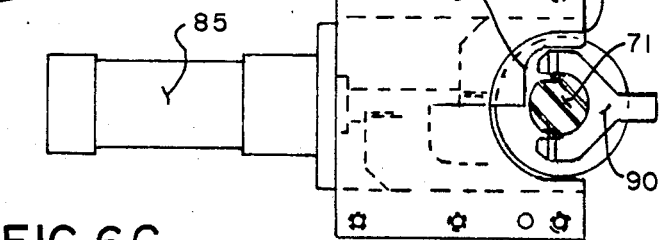
FIG. 6B is a partial sectional device taken along the line 6B—6B of FIG. 6.

A third cylinder unit 85 is mounted to the rod 26. The cylinder 85 operates an upward stop means 86. As shown in FIG. 6B, stop means 86 has a notch 87 formed in it, which is sized to receive the rod 71 of the cylinder 70. A plurality of adjustment means 90 may be inserted about the rod 71 of the cylinder 70 to limit movement of the cylinder 71 in the downward direction, depending upon the stack of the core being utilized with the device 1.

In the operation of the clamping device of this invention, the cylinder 70 is actuated to lower the platen 72 (see FIG. 6). The cylinder 80 then is actuated to lower the alignment means 81 through the bore of the core 21. Thereafter the alignment means 81 is retracted, and the cylinder 85 actuated to limit upward pressure on the cylinder 70, should such upward pressure be incurred during the axial insertion process. Thereafter a conventional axial insertion step is accomplished to insert the winding coils 10 into the core 21 in a manner well known in the art. After insertion, the platen 72 is raised to the position shown on the left hand side of FIG. 6, and the table 4 may be rotated to the final removal or off load position 103.

If desired, a positive stop may be employed in connection with the table 4, and such an embodiment is shown in FIG. 6. In that embodiment, a cylinder 95 has a plunger 96 associated with it, which is utilized positively to engage an opening 97 in the table 4 to lock the table 4 in position for axial insertion of the windings.

Figure 7:
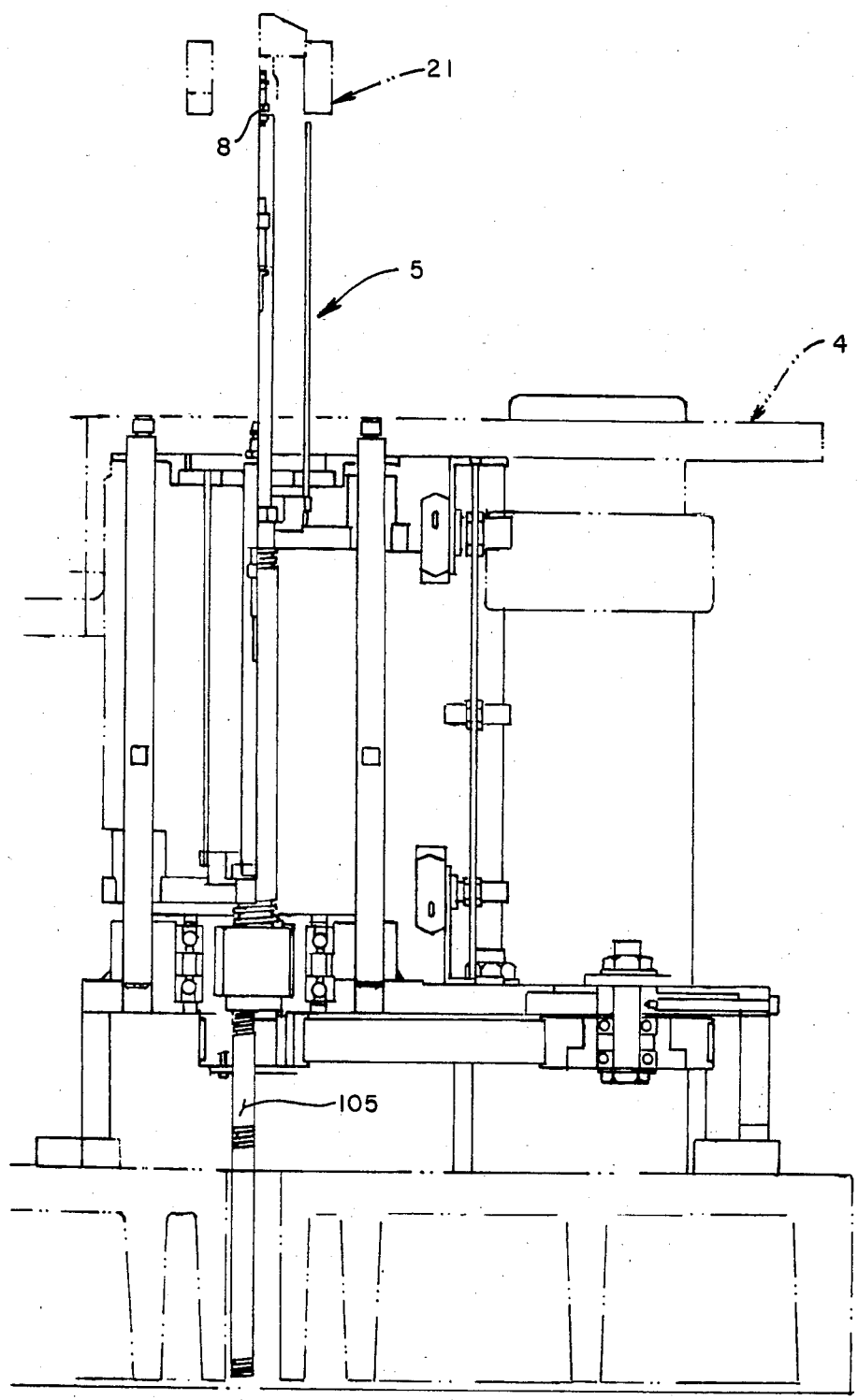
FIG. 7 is a view in side elevation, partly broken away showing the coil insert mechanism for the insertion station of the device shown in FIG. 3.
Figure 7B:
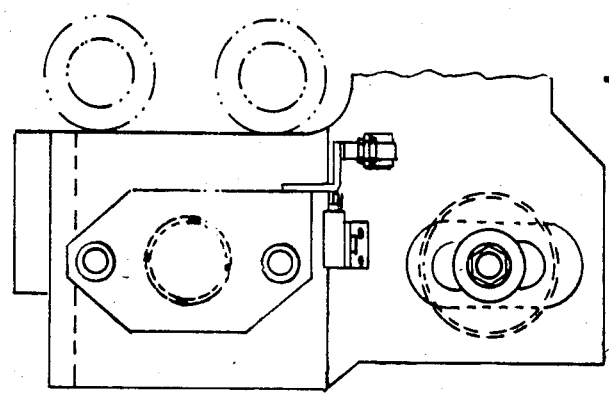
FIG. 7B is a top view of the lower tooling utilized in conjunction with the axial insertion station of FIG. 3.
Figure 7A:
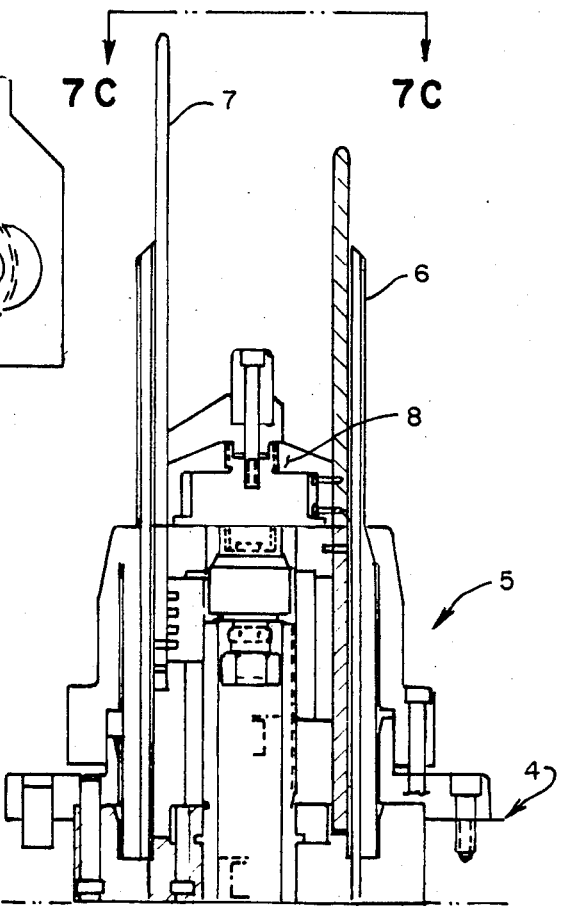
FIG. 7A is a partial sectional view of the upper tooling assembly utilized in conjunction with the various stations employed in conjunction with the device shown in FIG. 3.
Figure 7C:
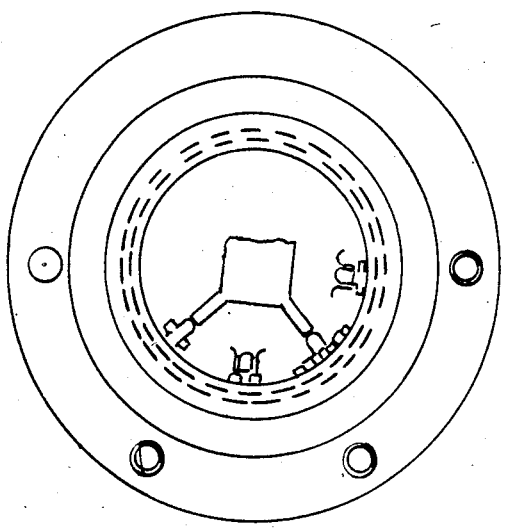
FIG. 7C is a top plan view taken along the line 7C—7C of FIG. 7A.
Figure 7D:
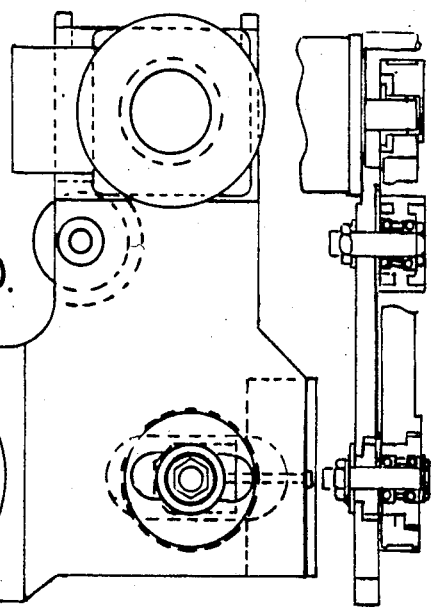
FIG. 7D is an illustration of a servo motor and take up mechanism for the axial insertion station shown in FIG. 7.
Figure 7E:
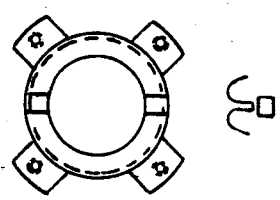
FIG. 7E is a top plan view corresponding to FIG. 7C—7C with the upper tooling removed, illustrating the adjustment capability of the device shown in FIG. 3 for stack height variation.

FIG. 7 shows the structure employed for the insertion process with the device 1. A positive drive lag screw 105 is operatively driven to raise and lower the stripper 8 as it travels between first and second positions. FIGS. 7C and 7E are views of fingers and blades and limit switches for controlling the travel limit of the stripper under influence of the screw 105. FIGS. 7B and 7D, respectively, illustrate the lower tooling and a servo motor take up mechanism for the drive screw 105.

After axial insertion of the winding, the table 4 may be indexed by the operator, as previously described, so that the core 21 on tooling 5 at position 102 is indexed to station 103. Once at that station, the arm 31 is actuated to remove the core 21 from the upper tooling 5 and position it on the conveyor 23. The arm 31, in the preferred embodiment of this invention is a mirror image of the arm 30 described above. Consequently, a detailed description of the arm 31 is omitted for specification simplicity. The primary difference between the arms 31 and 30 is the degree of rotational travel each of the arms make. Other operational features being similar. As will be appreciated by those skilled in the art, degree of travel of each of the arms can be varied in other embodiments of this invention.

As thus described, a core assembly device meeting all of the ends and objects herein set forth above is provided, whose operation is relatively simple to understand. An operator merely places coils on the tooling 5 and activates the start button. It has been found that the time required for table 4 rotation in 90 degree increments, and the performance of the various functions by the device 1 at the stations 101, 102 and 103 correspond to the time required for the operator to ready the next set of coils 10 for placement at the station 100. The wedge making process described above has increased the speed of the coil assembly device 1 considerably. The fact that wedge material need only be advanced a short distance greatly increases the operational speed of the device 1.

Numerous variations, within the scope of the appended claims, will be apparent to those skilled in the art in light of the foregoing description and accompanying drawings. For example, the aesthetic enclosure for the design can be varied, as may the number of stations employed with the table 4. While we have found that for a four station device functions well, the number of stations can be varied, if desired. The cylinders utilized in conjunction with the device are fluid cylinders, and may be either air or hydraulic. In the alternative, electrical drives can be employed. The integration of the device 1 with other automated equipment is contemplated within the broader aspects of the invention. These variations are merely illustrative.

Having thus described the invention, what is claimed and desired to be secured by Letters Patent is:

1. A system for constructing a plurality of stator assemblies for dynamoelectric machines, comprising:
    means for constructing a plurality of core assemblies for said stator assembly plurality at a first station, said core assemblies each having a plurality of closed bottom, winding receiving slots formed in them;

means for transporting said core assemblies to a second station;

means for at least partially inserting insulation for the closed bottoms of the slots of said core assemblies at said second station;

means for transporting said core assemblies to a third station;

an assembly apparatus at said third station, said assembly apparatus including first means for automatically removing a core assembly from said last mentioned transporting means and placing said core assembly in a first position; means for moving a winding of a dynamoelectric machine through a plurality of positions, said last mentioned means including a turn table mounted for rotation, said turn table including a plurality of stations each located at a predetermined location on said turn table, said turn table being rotatable through 360°, each of said stations including an upper tooling assembly of an axial insertion device, said automatic removing and placing means placing said core on said windings at one of said position pluralities; means for constructing a plurality of wedges operatively associated with at least one of said position plurality, said wedge constructing means including material for said wedges having a width dimension and a length dimension, said construction means advancing said material during construction of said wedge a length dimension substantially shorter than the width dimension; means for inserting said windings and said wedges at another of said position plurality; second means for automatically removing said core assembly and windings at a third of said position plurality; and means for adjusting the movement of said first automatic removing and placing means and said second automatic removing means operatively connected to said respective means.

2. The apparatus of claim 1 wherein said means for automatically removing and placing the core on said windings comprises an arm movable between at least a first position and second position, one of said positions corresponding to a pick-up point for a core assembly for said dynameoelectric machine, and the other of said positions being aligned with said upper tooling assembly, said adjusting means being operatively connected to said arm for determining the alignment of said core and said tooling.

3. The system of claim 2 further including an operator station in said station plurality for permitting placement of at least one winding on said upper tooling assembly.

4. The apparatus of claim 3 wherein said means for axially inserting said windings and said wedges comprises a screw driven operator.

5. The apparatus of claim 4 wherein said inserting means includes clamp means for holding a core in position on said tooling, said clamp means including adjustment means for varying the position of said clamp means with respect to the core of said dynamoelectric machine.

6. The system of claim 5 wherein said clamp means includes a stop for preventing excessive insertion pressure from acting upwardly against said clamp means.

7. In a coil assembly machine for constructing a stator assembly for a dynamoelectric machine including an enclosure for said coil assembly machine, said stator assembly including a core having a plurality of winding receiving slots formed in it, including means for forming wedges for placement in said slots, the improvement which comprises high speed wedge making means including a quantity of material having a length dimension and a width dimension, the width dimension of said material corresponding to the approximate height of said core, means for advancing said material along the length dimension thereof a distance corresponding to the approximate desired width of a wedge of said core, said width dimension of said wedge being smaller than the length dimension of said wedge, means for cutting the material after advancement, means for forming said material into a desired shape, storage means for storing a plurality of formed wedges, said wedge plurality corresponding to a number of slots in said core, means for driving said advancing means, said cutting means, said forming means and said storage means at a predetermined rate; means for moving a winding of a dynamoelectric machine through a plurality of positions, said winding moving means comprising a turn table mounted for rotation with respect to said enclosure, said turn table including a plurality of stations located at predetermined locations along said turn table, said turn table being rotatable through 360°, each of said stations including an upper tooling assembly of an axial insertion device; means for automatically placing a core on said windings at one of said position pluralities; means for inserting said windings and said wedges at another of said position pluralities; means for automatically removing said core assembly and said windings at a third of said plurality of positions; and means for selectively adjusting the movement of said automatic placing and automatic removing means operatively associated therewith.

8. The improvement of claim 7 further including an operator station at one of said station plurality for permitting placement of a plurality of windings on said tooling.

9. The improvement of claim 8 further including alignment means for checking alignment of the core assembly prior to its engagement by the automatic placement means and for checking the alignment of the upper tooling prior to depositing the core assembly thereon.

10. A system for constructing a plurality of stator assemblies for dynamoelectric machines, comprising:

means for constructing a plurality of core assemblies for said stator assembly plurality at a first station, said core assemblies each having a plurality of closed bottom, winding receiving slots formed in them;

means for transporting said core assemblies to a second station;

means for at least partially inserting insulation for the closed bottoms of the slots of said core assemblies at said second station;

means for transporting said core assemblies to a third station;

an assembly apparatus at said third station, said assembly apparatus including first means for automatically removing a core assembly from said last mentioned transporting means and placing said core assembly in a first position; means for moving a winding of a dynamoelectric machine through a plurality of positions, said last mentioned means including a plurality of stations, each of said stations including an upper tooling assembly of an axial insertion device, and means for moving said tooling assemblies between each of said stations, said automatic removing and placing means placing said core on said winding at one of said position pluralities;

means for constructing a plurality of wedges operatively associated with at least one of said position plurality, said wedge construction means including material for said wedges having a width dimension and a length dimension, said construction means advancing said material during construction of said wedge, a length dimension substantially shorter than the width dimension;

means for inserting said windings and said wedges at another of said position plurality;

second means for automatically removing said core assembly in said windings at a third of said position plurality; and means for adjusting the movement of said first automatic removing and placing means and said second automatic removing and placing means operatively connected to said respective means.

11. In a coil assembly machine for constructing a stator assembly for a dynamoelectric machine, including an enclosure for said coil assembly machine, said stator assembly including a core having a plurality of winding receiving slots formed in it, including means for forming wedges for placement in said slots, the improvement which comprises high speed wedge making means including a quantity of material having a length dimension and a width dimension, the width dimension of said material corresponding to the approximate height of said core, means for advancing said material along the length dimension thereof a distance corresponding to the approximate desired width of a wedge of said core, said width dimension of said wedge being smaller than the length dimension of said wedge, means for cutting the material after advancement, means for forming said material into a desired shape, storage means for storing a plurality of formed wedges, said wedge plurality corresponding to a number of slots in said core, means for driving said advancing means, said cutting means, said forming means and said storage means at a predetermined rate; means for moving a winding of a dynamoelectric machine through a plurality of positions, said winding moving means including a plurality of stations located at predetermined locations, each of said stations including an upper tooling assembly of an axial insertion device, and means for moving said tooling assemblies between each of said stations; means for automatically placing a core on said windings at one of said position pluralities; means for inserting said windings and said wedges at another of said position pluralities; means for automatically removing said core assembly and said windings at a third of said plurality of positions; and means for selectively adjusting the movement of said automatic placing and automatic removing means operatively associated therewith.

* * * * *